United States Patent
McCollom et al.

(10) Patent No.: US 9,541,467 B2
(45) Date of Patent: Jan. 10, 2017

(54) AUTOMATIC PRESSURE-ADJUSTING LEAK DETECTING APPARATUS AND METHOD

(71) Applicants: Gregory M. McCollom, Anaheim, CA (US); Edward A. Murashie, Santa Ana, CA (US); Gary W. Halmbacher, Santa Ana, CA (US)

(72) Inventors: Gregory M. McCollom, Anaheim, CA (US); Edward A. Murashie, Santa Ana, CA (US); Gary W. Halmbacher, Santa Ana, CA (US)

(73) Assignee: STAR EnviroTech, Inc., Huntington Beach, CA (US)

( * ) Notice: Subject to any disclaimer, the term of this patent is extended or adjusted under 35 U.S.C. 154(b) by 274 days.

(21) Appl. No.: 14/301,131

(22) Filed: Jun. 10, 2014

(65) Prior Publication Data

US 2015/0355047 A1 Dec. 10, 2015

(51) Int. Cl.
G01M 3/04 (2006.01)
G01M 3/02 (2006.01)
G01M 3/20 (2006.01)

(52) U.S. Cl.
CPC ............... *G01M 3/04* (2013.01); *G01M 3/025* (2013.01); *G01M 3/20* (2013.01)

(58) Field of Classification Search
CPC ........... G01M 3/04; G01M 3/20; G01M 3/025
USPC .................................................. 73/40, 40.7
See application file for complete search history.

(56) References Cited

U.S. PATENT DOCUMENTS

| | | | |
|---|---|---|---|
| 5,922,944 A | 7/1999 | Pieroni et al. | |
| 6,477,890 B1 | 11/2002 | Hulsebus | |
| 6,526,808 B1 | 3/2003 | Pieroni et al. | |
| 7,305,176 B1 * | 12/2007 | Pieroni | F24F 11/0086 239/135 |
| 2012/0201522 A1 | 8/2012 | Stauffer et al. | |

FOREIGN PATENT DOCUMENTS

| | | |
|---|---|---|
| GB | 640266 | 7/1950 |
| GB | 1039729 | 8/1966 |
| GB | 1240867 | 7/1971 |

* cited by examiner

*Primary Examiner* — Benjamin Schmitt
(74) *Attorney, Agent, or Firm* — Morland C. Fischer

(57) ABSTRACT

A leak detecting apparatus and method by which a regulated supply of gas is delivered from an adjustable pressure regulator to a smoke generator so that smoke generated within the smoke generator and carried to a fluid system being tested for leaks is at optimal density throughout the pressure range. The leak detecting apparatus and method have particular application for testing high pressure operating systems (e.g., the engine of a turbo-charged motor vehicle). A flow transducer measures the rate at which the regulated supply of gas flows to the smoke generator. First and second pressure transducers measure the pressure of the regulated gas and the pressure of the system being tested for leaks. The system under test is visually inspected for leaks after the pressure regulator is adjusted to a pressure to create an optimal maximum flow rate and the pressures measured by the first and second pressure transducers are equalized.

22 Claims, 7 Drawing Sheets

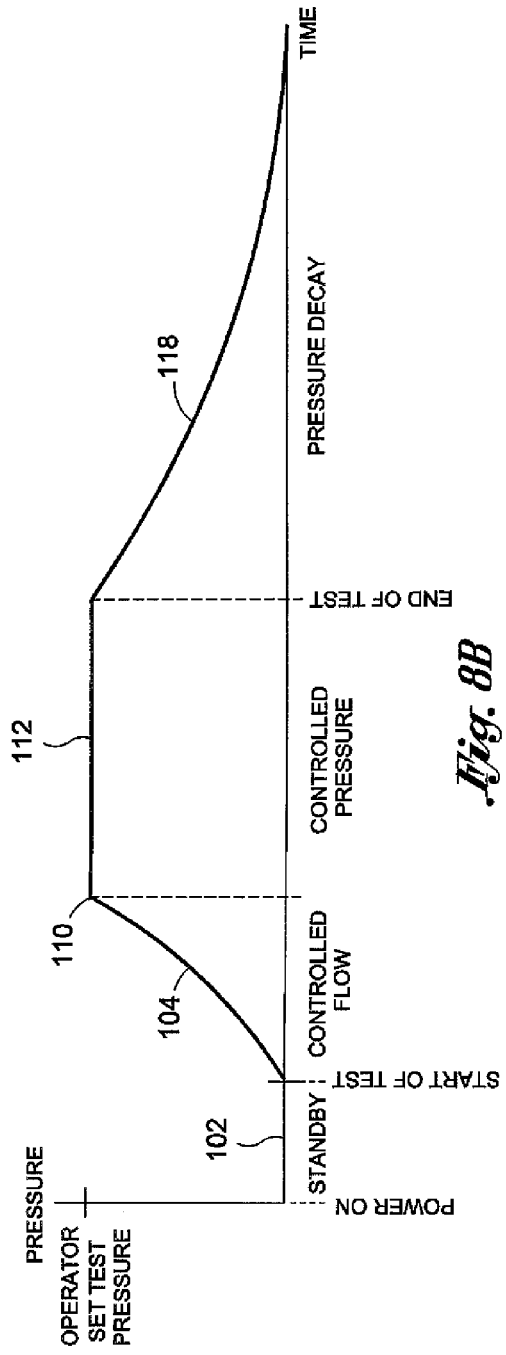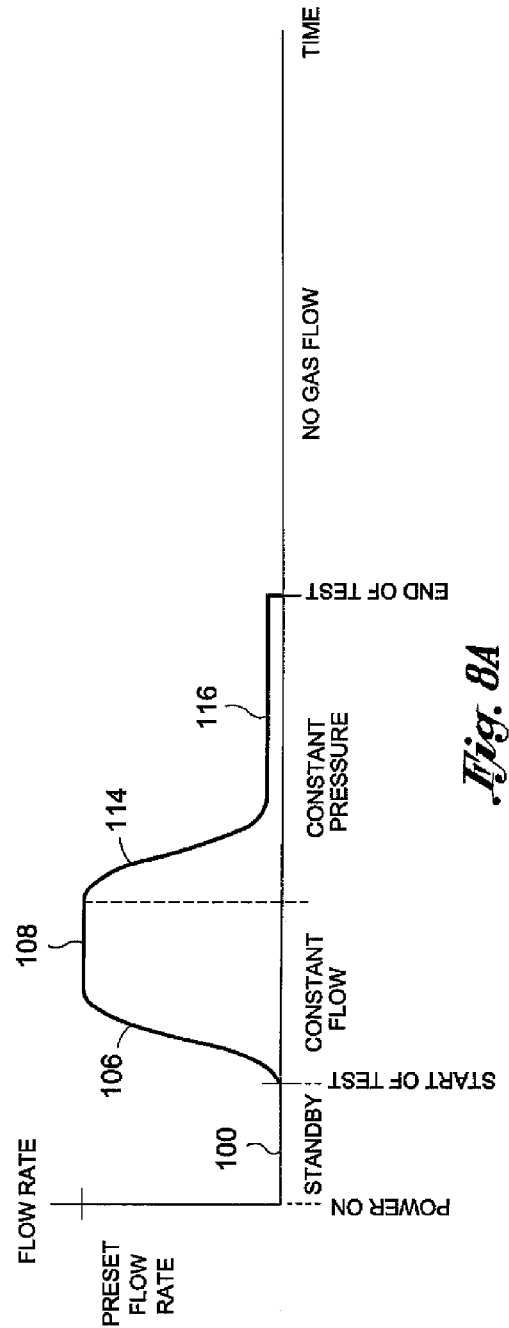

AUTOMATIC PRESSURE-ADJUSTING LEAK DETECTING APPARATUS AND METHOD

BACKGROUND OF THE INVENTION

1. Field of the Invention

This invention relates to an automatically adjustable, microcontroller controlled leak detecting apparatus and method for delivering smoke at an optimal smoke density throughout the pressure range so as to provide a reliable visual indication of the presence and location of a leak. The foregoing is accomplished by delivering a regulated supply of gas (e.g., compressed air) at an optimal pressure and flow rate from a pressure regulator to a smoke generator to be mixed with the gas and carried thereby to a fluid system under test. The leak detecting apparatus and method herein disclosed have particular application for testing systems (e.g., a turbo-charged engine of a motor vehicle) that operate at high pressures.

2. Background Art

Because of concerns for the environment, and due to excessive engine fuel consumption, it has become increasingly important to be able to test the integrity of the engine of a motor vehicle so as to determine the presence and location of a leak in need of repair. In this regard, with the engine turned off, air has been introduced into the engine system in order to attempt to hear the air leak(s). In another method, also with the engine turned off, smoke generating machines have been used for generating a visible gas or vapor that is mixed with air or other gas and carried to the system undergoing testing. By observing any smoke which exits a small and often visually imperceptible hole in the system under test, an indication is provided to the observer of the presence and location of the leak so that a repair might be made. Engine air leaks create engine loss of power and increased fuel consumption.

In the case of turbo-charged and/or boosted motor vehicles, several methods are known for locating vehicle system leaks. One such method is to use compressed air, controlled by a pressure regulator and pressure gauge, in order to introduce air pressure into the engine systems, with the engine turned off. An attempt is then made to listen for the air pressure escaping at potential leak sites that may need repair. Another method is to supply a gas under pressure (e.g., typically compressed air/shop air) to a system under test by way of a leak detector including a solenoid, a manually-operated pressure regulator, a ball indicator-type flow meter, a pressure gauge, a canister containing mineral oil, and a heater. Voltage is applied to the heater to heat the mineral oil within the canister. The oil is vaporized into smoke, and the smoke is blown by the gas supply to the test system. The visual observation of any smoke which exits the system provides a technician with an indication of the location of the leak so that a repair can be completed.

However, turbo and other boosted engine systems operate at significantly higher system pressure than non-turbo or non-boosted systems. These systems will commonly experience air leaks at high system pressures. Therefore, in the case of smoke generating leak detectors, using low pressure smoke generators cannot create sufficient pressure in the engine systems in order to simulate the engine's operating pressures. Consequently, it would be quite difficult to find leaks in such higher pressure systems using a low pressure device.

The density of the smoke being supplied to a system under test is greatly affected by the rate at which the gas flows into and out of the smoke-producing canister. A heater for vaporizing the smoke-producing solution can produce only a finite volume of smoke vapor. The volume of gas introduced into the smoke-generating canister is directly affected by the smoke generator's output pressure, such that the higher the set pressure, the greater the volume. Consequently, high pressure smoke generators produce a less-dense smoke by volume, which results in the system under test being filled primarily with the carrier gas from the initial supply thereof. In this same regard, less visible smoke exits the system making it harder for the technician to detect the leak site. When the pressure regulator is randomly increased for too long a time and/or too high a pressure setting and the system being tested is at a lower atmospheric pressure, the flow rate of the carrier gas is correspondingly increased to sometimes exceed the rate at which visible smoke can be produced. That is to say, the higher the flow rate, the thinner the smoke that will be available to exit the leak site. Consequently, the density of the smoke which exits the system is decreased which also makes it difficult for the technician to identify the leak site.

Accordingly, it would be desirable to avoid the aforementioned disadvantages inherent with a conventional manually-adjusted leak detector by automatically and simultaneously adjusting the flow rate and pressure of the carrier gas to optimal levels at which to ensure that thick dense smoke throughout the pressure range is carried to the system under test so that the leak site can be more easily and reliably determined.

SUMMARY OF THE INVENTION

In general terms, disclosed below is an automatically-adjustable, microcontroller controlled leak detecting apparatus which is adapted to supply inlet compressed air or any other suitable inert gas at an optimal flow rate and pressure to a system being tested for leaks so that the system can be, pressurized and the presence and location of a leak can be accurately and visibly determined. The leak detecting apparatus includes a smoke (i.e., visible vapor) generator or a fluid pump and atomizing device by which a suitable smoke-producing liquid is either heated and vaporized or atomized into a vapor. The pressure of the inlet air is regulated by a pressure regulator so as to be mixed with and carry the smoke from the smoke generator to the system under test, whereby thick dense smoke will be blown through any leak in the system. The leak detecting apparatus has particular application for testing systems that operate at high pressure such as, for example, systems that operate with a turbo-charged or an otherwise boosted engine as well as industrial applications where there is a desire to test those systems at elevated test pressures.

The inlet air is supplied first to a pressure switch which enables the controller to permit a leak test when the inlet air has reached at least a pre-determined minimum pressure. The inlet air is then supplied to the pressure regulator which is driven by a stepper, servo, or electronic pressure regulator motor. Reduction gears of the stepper motor are rotated and the pressure regulator is adjusted by the controller. Regulated air is delivered from an outlet nozzle of the pressure regulator to an inlet side of a normally-closed solenoid by way of a flow transducer that is electrically connected to the controller to measure the rate of which the regulated air flows from the regulator. The solenoid is also electrically connected to the controller so as to be opened in order to initiate a leak test. With the solenoid opened, the regulated air is supplied from the outlet side of the solenoid to the smoke generator. The smoke-producing liquid is heated and vaporized into smoke within the smoke generator, and the smoke is carried by the regulated air supply to the system being tested for leaks. A first pressure transducer is pneumatically coupled between the controller and a connector at the inlet side of the solenoid so as to measure the pressure of the regulated air at the outlet nozzle of the pressure regulator. A second pressure transducer is pneumatically coupled between the controller and a connector that communicates with the interior of the smoke generator at the outlet side of the solenoid so as to measure the pressure of the system under test that is being pressurized by the regulated air supplied by the pressure regulator.

At the start of a leak test, the controller opens the solenoid and causes either a heater from the smoke generator to be energized or a fluid pump and atomizing nozzle (which has no heater) to be activated. The pressure regulator is adjusted by the controller so that the pressure of the regulated air is gradually increased. The flow rate measured by the flow transducer through which the regulated air flows from the pressure regulator to the smoke generator rises rapidly until a pre-determined optimal flow rate is achieved. The optimal flow rate is then held constant (regardless of the rising pressure to which the pressure regulator is adjusted) until an optimal operator-set test pressure is achieved at which time the pressure regulator and system pressures measured by the first and second pressure transducers at the inlet and outlet sides of the solenoid are equalized. With the system under test fully pressurized, the pressure of the regulator is held constant such that the regulated air supplied to the smoke generator is reduced. Thus, the flow rate measured by the flow transducer is correspondingly decreased during which time the system being tested is visually inspected for any smoke which escapes therefrom to indicate a leak. At the conclusion of the leak test, the controller causes the solenoid to close and the heater of the smoke generator to be de-energized or the fluid pump and atomizing nozzle to be deactivated. The system pressure (at the outlet side of the solenoid measured by the second pressure transducer) is then monitored for decay which is also indicative of the presence and size of a leak in the system being tested for leaks.

BRIEF DESCRIPTION OF THE DRAWINGS

FIG. 8A represents the flow rate of a pressure regulated gas being supplied from a pressure regulator to the smoke generator of FIG. 6 prior to, during and after a leak test performed by the leak testing apparatus of this invention; and FIG. 8B represents the pressure to which the pressure regulated gas is automatically adjusted prior to, during and after the leak test.

DESCRIPTION OF THE PREFERRED EMBODIMENT

An automatic pressure-adjusting leak detecting apparatus 1 having a smoke generator 2 that is capable of producing visible vapor (commonly known in the trade and referred to below as "smoke") by which the presence and location of a leak in a closed fluid system can be reliably detected is disclosed while referring initially to FIGS. 1 and 2 of the drawings. The leak detecting apparatus 1 to generate the aforementioned smoke has particular application for detecting leaks in fluid systems of motor vehicles that operate at a variety of high pressures depending upon the vehicles. By way of example only, one such high-pressure operating fluid system with which the leak detecting apparatus 1 can be used to test for leaks is the engine system of a turbo-charged motor vehicle.

As will be explained in greater detail hereinafter, the leak detecting apparatus 1 is adapted to controllably produce an ideal supply of thick, dense smoke at a particular flow rate and pressure as are required to reliably test any one of a number of different fluid systems for leaks depending upon the physical and operating characteristics of the system undergoing testing. By virtue of the foregoing, technicians will be able to make an accurate determination of the presence and location of a leak by visually observing the dense smoke which escapes under pressure from the leak site of the system being tested.

While reference will be made herein to "smoke," the actual visible vapor that is generated by leak detecting apparatus 1 and observed to identify the leak site may be either an aerosol mist produced by evaporation and condensation at controlled temperatures or the result of a non-heated fluid atomization produced with a fluid pump and atomizing nozzle. Hence, in the preferred embodiment, "smoke" refers to either a (e.g., petroleum-based) smoke-producing solution that is heated and vaporized or to a visible aerosol mist, spray, gas, vapor or combination thereof whether heated or not.

Figure 1:
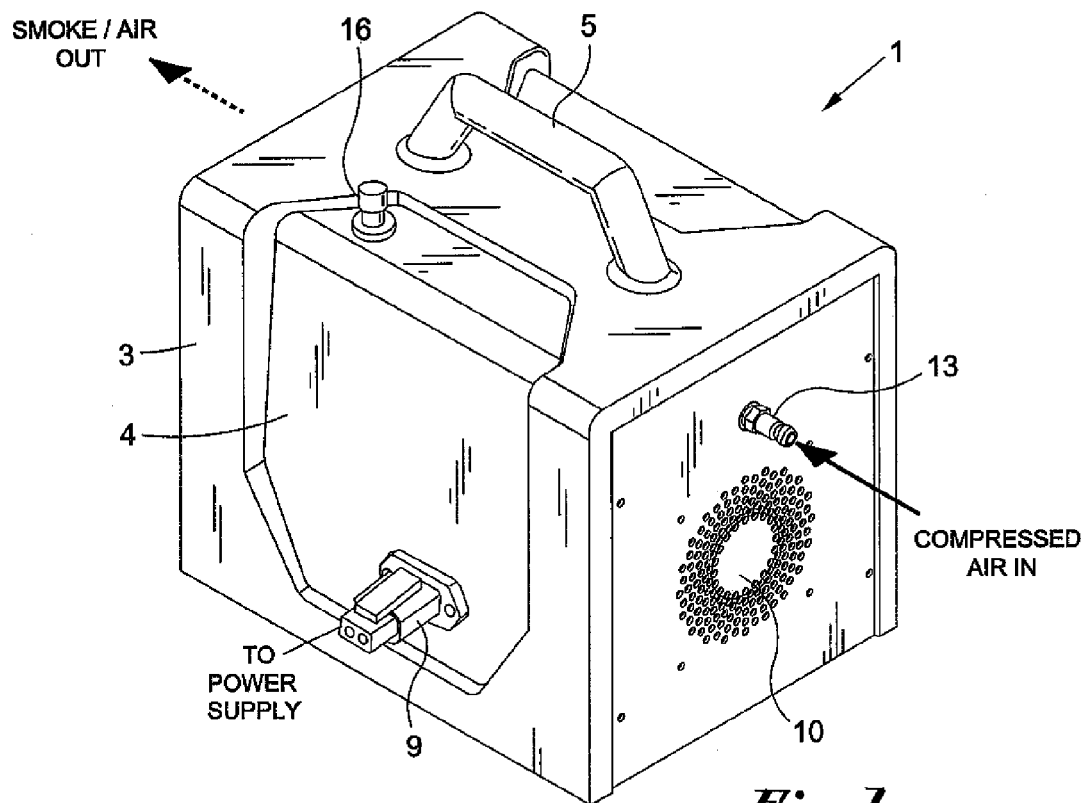
FIGS. 1 and 2 show opposite sides of an automatic pressure-adjusting leak detecting apparatus of this invention for locating leaks in a fluid system.
Figure 2:
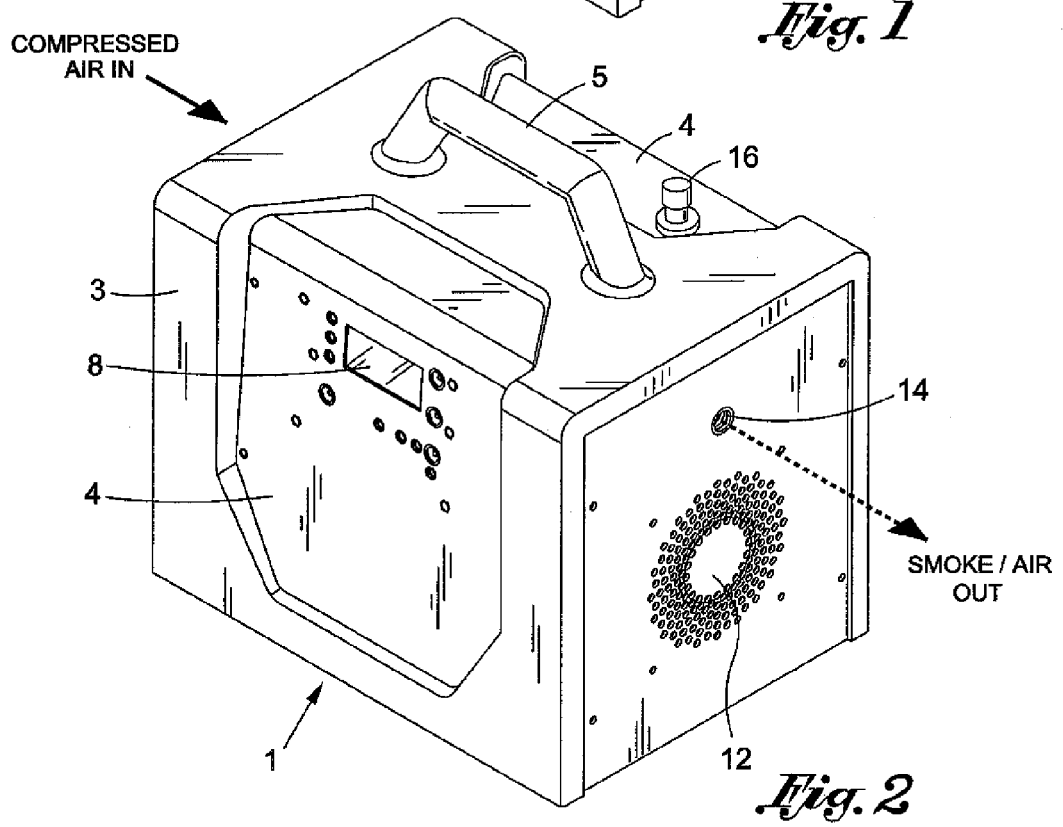
Figure 3:
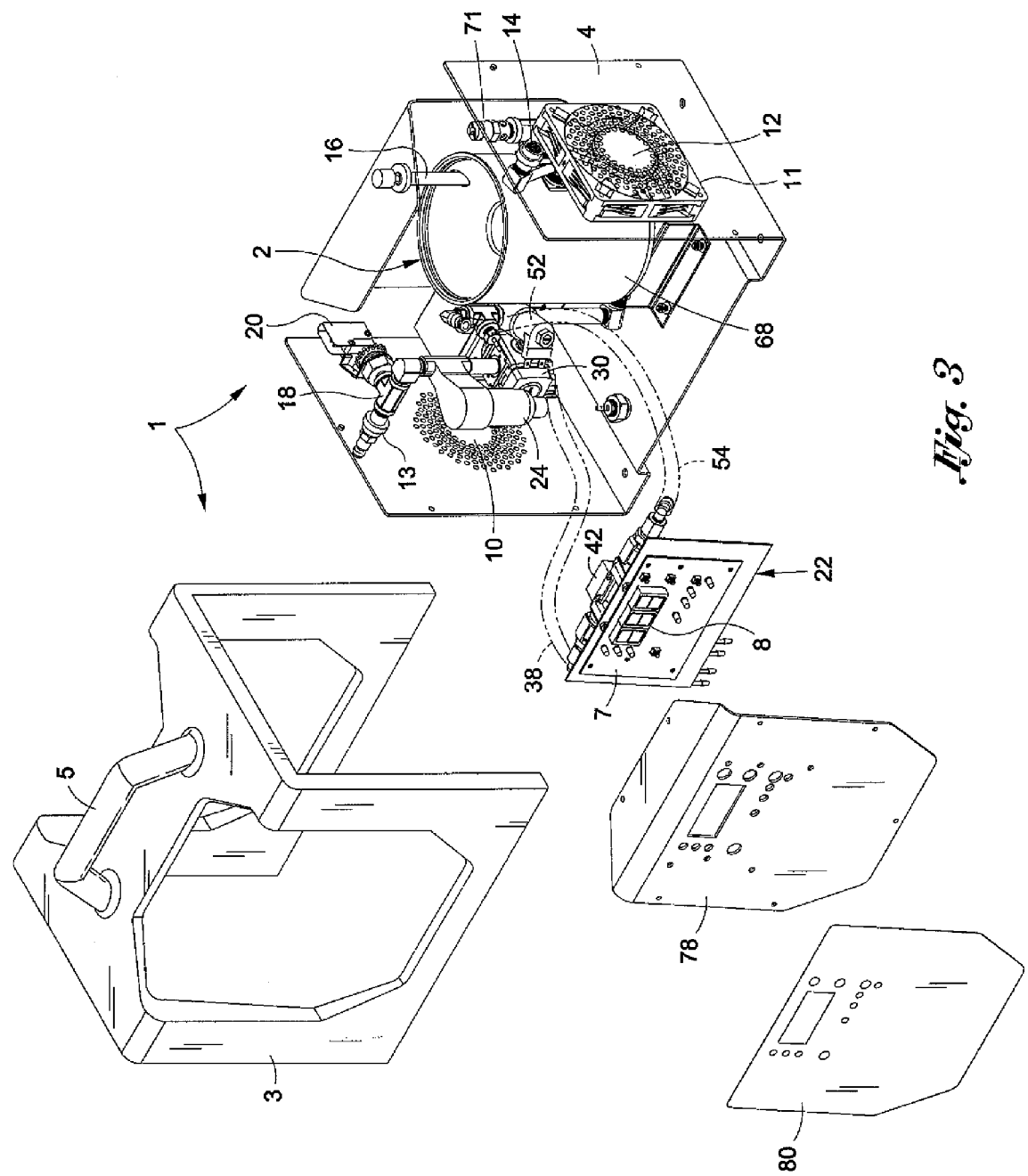
FIG. 3 is an exploded view of the leak detecting apparatus shown in FIGS. 1 and 2.

The leak detecting apparatus 1 of FIGS. 1 and 2 includes a shock-resistant (e.g., injection molded), hand-held and portable enclosure 3. A handle 5 attached to the top of enclosure 3 enables the apparatus 1 to be carried from place-to-place to be suitable for use with a variety of systems to be tested for leaks at different locations. The enclosure 3 surrounds a chassis 4. Located at one side of the chassis 4 is a control panel 7 (best shown in FIGS. 3 and 4) which includes an operator display 8 and a plurality of LEDs and push buttons, the purpose of which will soon be disclosed. Located at the opposite side of the chassis 4 is a power connector 9 to be connected to an electrical (e.g., 110 volt AC or 12 volt DC) power supply. Cooling fan grilles 10 and 12 are formed in the opposite ends of the chassis 4 to permit hot air to be exhausted from the chassis into the atmosphere. A cooling fan (designated 11 in FIG. 4) is operated to cool the interior of the chassis 4.

Extending through one end of the chassis 4 is an air inlet fitting 13. The air inlet fitting 13 is preferably coupled to a source of compressed air, such as shop air. However, inlet fitting 13 may also be coupled to any suitable source of gas under pressure, including an inert (e.g., nitrogen or carbon dioxide) gas so that explosions might be better avoided while conducting leak tests within a potentially explosive environment. Located at the opposite end of the chassis 4 is a vapor outlet port 14 through which a vapor (e.g., a mixture of smoke and air) is blown from the smoke generator 2 within the chassis (best shown in FIG. 6) to a system under test. A fluid level dip stick 16 is manually accessible at the top of the chassis 4 to monitor the level of a petroleum solution or the like that is located inside the smoke generator 2 to be heated and vaporized into smoke.

Operating details of the automatic pressure-adjusting leak detecting apparatus 1 according to a preferred embodiment of this invention are now disclosed while referring concurrently to FIG. 3-6 of the drawings. Compressed air, or any other suitable gas under pressure, is delivered from a source thereof to the leak testing apparatus 1 at the air inlet fitting 13 through the chassis 4. The air inlet fitting 13 is connected to a T-coupler 18. One end of T-coupler 18 communicates with a 2-state (i.e., on/off) pressure switch 20.

As one important feature of the leak detecting apparatus 1, the pressure switch 20 senses and is responsive to the pressure of the incoming air at inlet fitting 13. To this end, the pressure switch 20 is electrically connected to a controller 22 by which a pre-determined pressure can be set by the operator to which the pressure switch 20 is responsive to be able to switch from a normally off state to an on state. By way of example, one suitable controller for use herein is microcontroller Model No. PIC16F1939 manufactured by Microchip, Inc. The pressure switch 20 will remain in its off state during which to signal the controller that there is inadequate air pressure (so that the leak detecting apparatus 1 will be inoperable). Once the pressure switch 20 senses at least a minimum pre-determined pressure at the T-coupler 18, the controller is alerted so that the leak detecting apparatus 1 can now conduct a leak test.

Provided that the minimum air pressure has been achieved and the pressure switch 20 has notified the controller (during which the leak detecting apparatus 1 is operable), incoming air from the inlet fitting 13 will flow through the T-coupler 18 and an in-line air filter 24. An automatic filter drain 26 is located through the bottom of the chassis 4 below the air filter 24 and the smoke generator 2. Thus, clean dry air is supplied from the filter 24 to a mechanical or electronic pressure regulator 30 which has an integrated pressure bleed orifice 31 by which the pressure to which the regulator 30 has been set can be reduced. The pressure regulator 30 is set (i.e., adjusted) by means of a stepper motor 32 (best shown in FIG. 5) or a servo motor (not shown) that is surrounded by a (e.g., metallic) motor cover 34. The stepper motor 32 is connected to the shaft of the pressure regulator 30 by way of a pair of meshing reduction gears 36 which are rotated incrementally by the controller 22 to increase motor torque and thereby drive pressure regulator 30. The reduction gears 36 of motor 32 are preferably sized to have a ratio of 4 to 1. A supply of regulated air under pressure is carried by a first air hose 38 from an outlet nozzle 40 of the pressure regulator 30 to a flow transducer 42.

The flow transducer 42 is mounted on the controller 22 to receive the pressure regulated air supplied thereto by the first air hose 38. The flow transducer 42 measures the rate at which the air flows from hose 38. The controller 22 includes a pair of pressure transducers 44 and 46 electrically connected thereto. A first pressure transducer 44 is responsive to the output pressure of the pressure regulator 30 (which corresponds to a pressure to which the regulator 30 is automatically set by the controller 22 of the leak detecting apparatus 1). The second pressure transducer 46 is responsive to the pressure of the system being tested for leaks that is interfaced with and receives the smoke generated by the leak detecting apparatus 1.

More particularly, a first pressure hose 48 is pneumatically connected between the first pressure transducer 44 and a barbed fitting of a T-coupler 50 that communicates with one side (i.e., the inlet side) of a solenoid 52. The solenoid 52 is controlled (i.e., opened and closed) by the controller 22 by way of wires (not shown) that run between the controller and electrical terminals 53 of solenoid 52. The flow transducer 42 of controller 22 is coupled to the first side of solenoid 52 by Way of a second air hose 54 and the T-coupler 50. A second pressure hose 56 is pneumatically connected between the second pressure transducer 46 and a barbed fitting of an outlet nozzle 58 that communicates with the smoke generator 2, whereby the pressure of the system under test is measured.

A smoke generator air supply tube 60 is connected between the solenoid 52 and the smoke generator 2. One end of the air supply tube 60 communicates with the outlet side of the solenoid 52. The outlet side of solenoid 52 lies opposite the inlet side thereof to which the flow transducer 42 and air hose 54 are connected (via T-coupler 50). As is best shown in FIG. 6, the smoke generator air supply tube 60 runs from the outlet side of solenoid 52 and turns below the smoke generator 2 at which to be coupled to a smoke generator air inlet nozzle 62 by way of a one-way check valve 64.

Figure 6:
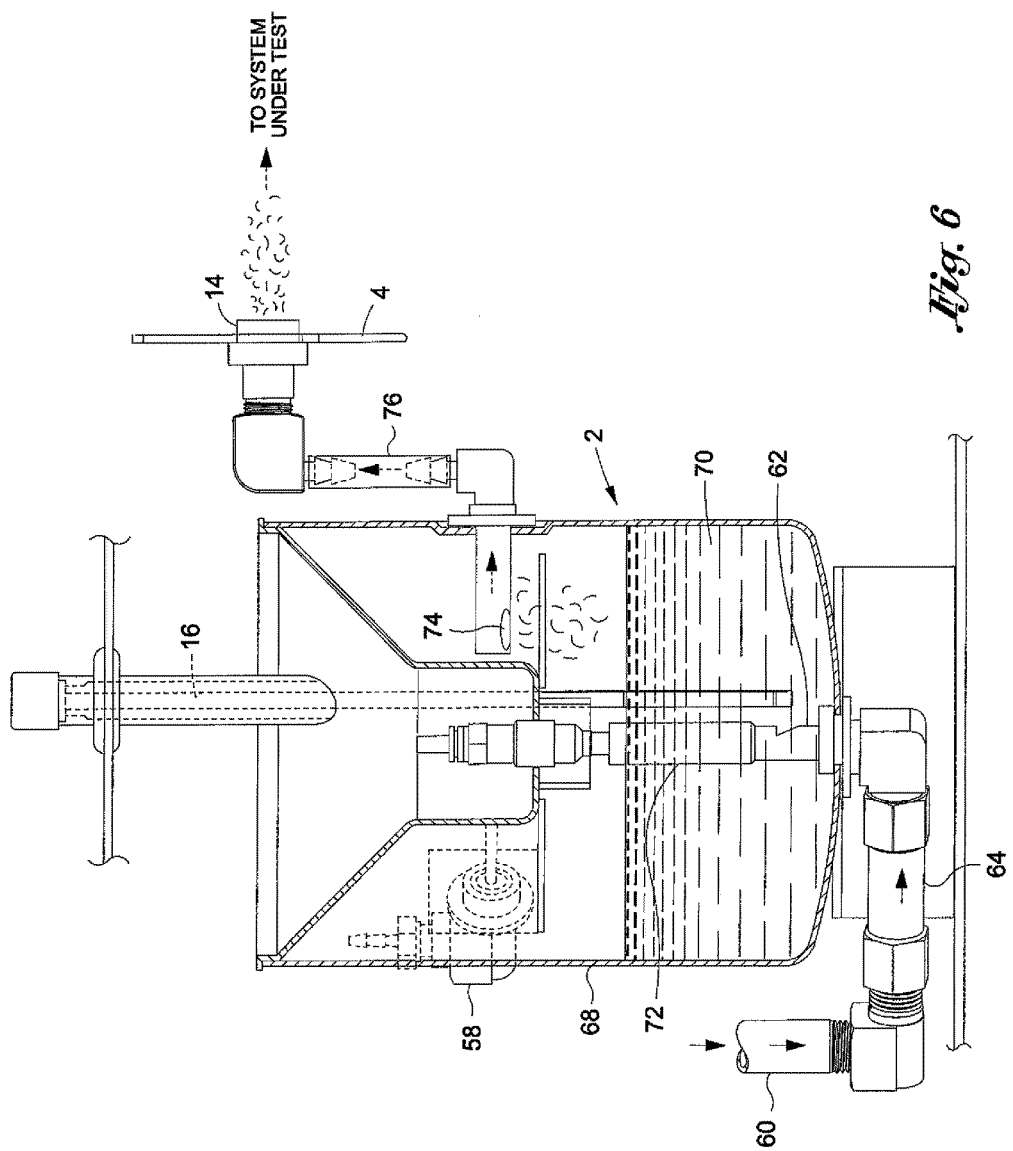
FIG. 6 shows a smoke generator from the leak detecting apparatus of FIGS. 4 and 5.

Referring specifically to FIG. 6, details are provided of the smoke generator 2 of the automatic pressure-adjusting leak detecting apparatus 1. Smoke generators, like that shown in FIG. 6, are generally known. By way of example only, reference may be made to U.S. Pat. No. 5,922,944 issued Jul. 13, 1999 for an example of a smoke generating device that contains a solution to be vaporized to produce smoke for use in testing leaks. The smoke generator 2 of FIG. 6 includes a sealed container 68 into which is poured a (e.g., non-toxic) petroleum-based liquid 70 that is adapted to be heated and vaporized. One suitable liquid 70 to be vaporized within the container 68 is mineral oil. A dye may be added to the liquid 70 to enhance the visual detection of the leak site. The level of the liquid 70 within container 68 is monitored by means of the aforementioned dip stick 16. A normally closed pressure relief valve 71 communicates with the interior of the container 68 so as to open automatically to the atmosphere in the event of an excessive pressure buildup.

Air under pressure is forced upwardly through the air inlet nozzle 62 which is submerged within the liquid 70 inside container 68 of the smoke generator 2. Some of the liquid 70 is thereby suctioned into the air inlet nozzle 62 and transported to a heater 72 (e.g., a resistance heater wire) by which the liquid is heated and vaporized into smoke. The heater 72 is energized at the start of the leak test by power supplied from the power connector 9 of FIG. 1 and controlled by the controller 22 (of FIG. 4).

The resulting smoke generated by heating the liquid 70 is carried by the regulated air being delivered to chamber 68 from the smoke generator air supply tube 60 through an outlet orifice 74 and outwardly from the chamber 68 through a vapor outlet tube 76. The vapor outlet tube 76 communicates with the aforementioned vapor outlet port 14 which extends through the chassis 4 of the leak detecting apparatus 1 so that a mixture of smoke and air is delivered to the system being tested for leaks.

The smoke generator 2 shown in FIG. 6 may be replaced by an atomizer or the like which does not require heat (in which case the heater 72 will be deenergized). Such an atomizer device produces a mist or vapor spray to be mixed with and carried by a gas to the system being tested for leaks. Moreover, additional reference can be made to U.S. Pat. No. 6,477,890 issued Nov. 12, 2003 for an example of a smoke vapor generator having a liquid nozzle that sprays a smoke-producing solution against an electrically-conductive heater element. What is even more, smoke can be generated by means of a porous oil transporting vaporizer tube that is submerged in an oil reservoir and wrapped in an electrically-conductive heater wire. Such an oil transporting vaporizer tube is shown and described in pending patent application Ser. No. 13/608,660 filed Sep. 10, 2013 to be assigned to the assignee of this application.

FIG. 6 also shows the outlet nozzle 58 which communicates with the interior of the container 68 of smoke chamber 2 and which is pneumatically connected to the second of the two pressure transducers 46 of the controller 22 by way of the second pressure hose 56. As was previously explained, the pressure transducer 46 measures the pressure of the system being tested for leaks by the leak testing apparatus 1. The first of the two pressure transducers 44 was previously explained as being pneumatically connected to the T-coupler 50 by way of the first pressure hose 48 so as to measure the pressure of regulator 30.

In this regard, it may be appreciated that the pressure transducers 44 and 46 are respectively connected to opposite sides of the solenoid 52. By virtue of the foregoing, the controller 22 is responsive to the pressure of the air at the corresponding inlet and outlet sides of the solenoid 52. As will be explained in greater detail hereinafter, the first pressure transducer 44 senses the pressure at the inlet side of the solenoid 52 for the air that is supplied to the solenoid from the outlet nozzle 40 of the pressure regulator 30 and the flow transducer 42 of the controller 22. Therefore, the controller 22 to which the first and second pressure transducers 44 and 46 are electrically connected will be responsive to any difference between the pressure to which the pressure regulator 30 is adjusted and the pressure of the system under test (at the outlet nozzle 58).

In this same regard, when the solenoid 52 is closed by the controller 22, air flow between the inlet and outlet sides of the solenoid is blocked, the heater 72 of smoke generator 2 is de-energized, and no smoke is produced. When the solenoid 52 is opened to begin a leak test, air flow to the smoke generator 2 is initiated, and the heater 72 is energized so that the mixture of air and smoke is produced for delivery from the container 68 to the system under test.

Figure 4:
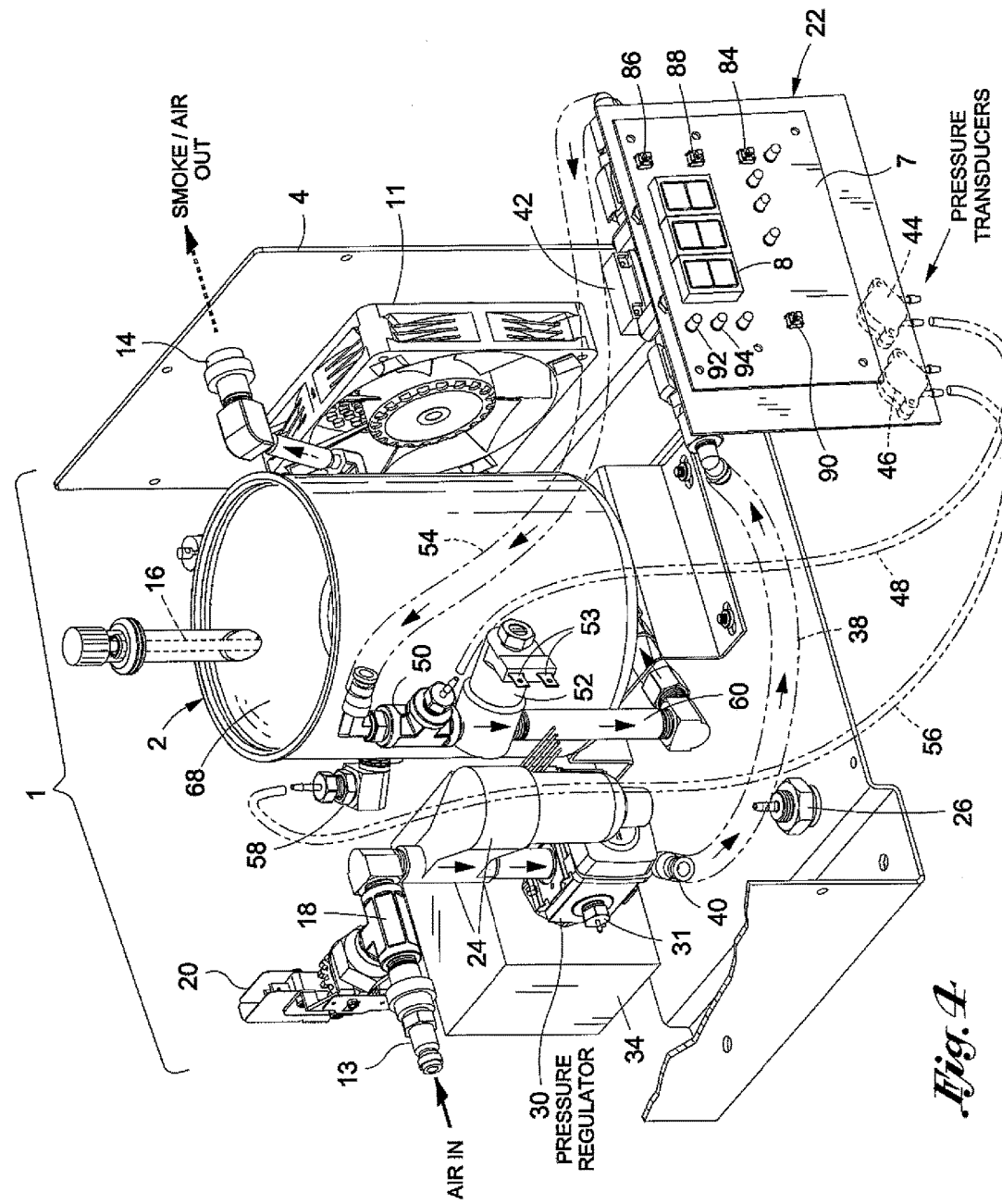
FIGS. 4 and 5 illustrate functional details of the leak detecting apparatus of this invention according to a preferred embodiment thereof.
Figure 5:
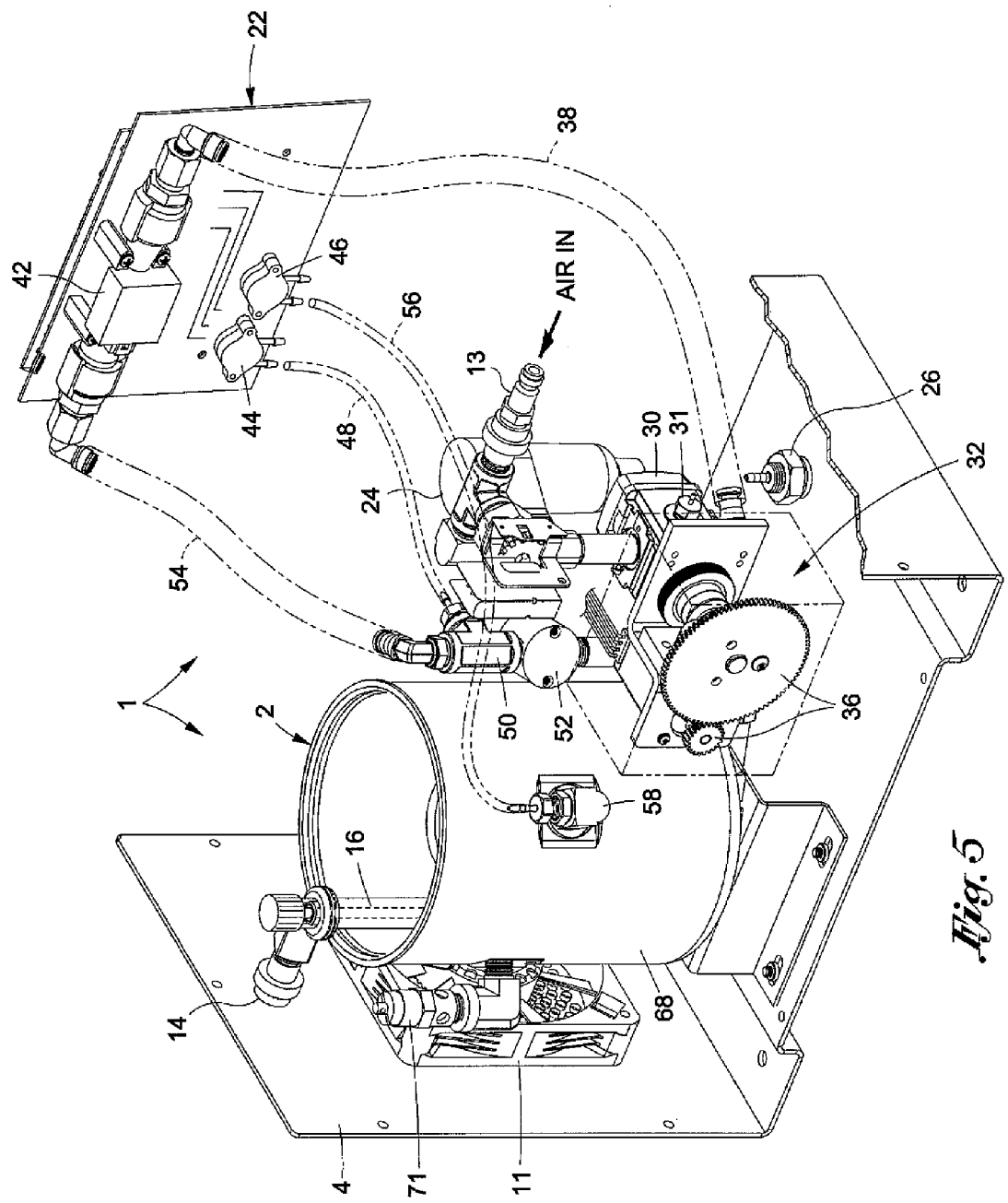

A brief description of the control panel 7 of the controller 22 of the automatic pressure-adjusting leak detecting apparatus 1 is provided while referring particularly to FIG. 4. The control panel 7 is covered and protected by a (e.g., sheet metal) face plate 78 (of FIG. 3). A label or decal 80 (also of FIG. 3) is affixed to the front of the face plate 78 for aesthetic purposes and to provide useful operating indicia to the operator.

The control panel 7 includes a start/stop push button 84 that is depressed to enable the operator to begin or terminate the generation of smoke within the smoke generator 2 for use in testing a system for leaks. When push button 84 is depressed to start a leak test, the solenoid 52 is opened to permit the flow therethrough of air from the pressure regulator 30. One of a pair of pressure adjustment push buttons 86 and 88 is depressed to enable the operator to either increase or decrease the pressure to which the pressure regulator 30 is adjusted by the controller 22 to conduct a leak test. An additional push button 90 is depressed to enable the operator to selectively monitor either pressure or flow rate. One of a corresponding pair of indicator (e.g., LED) lights 92 or 94 is illuminated to indicate whether the controller 22 is currently responsive to the flow rate of the regulated air to which the pressure regulator 30 has been adjusted or to the air pressure of the system under test detected by the flow transducer 42. The display 8 mounted on the control panel 7 provides a visual indication of the aforementioned parameters.

Figure 7:
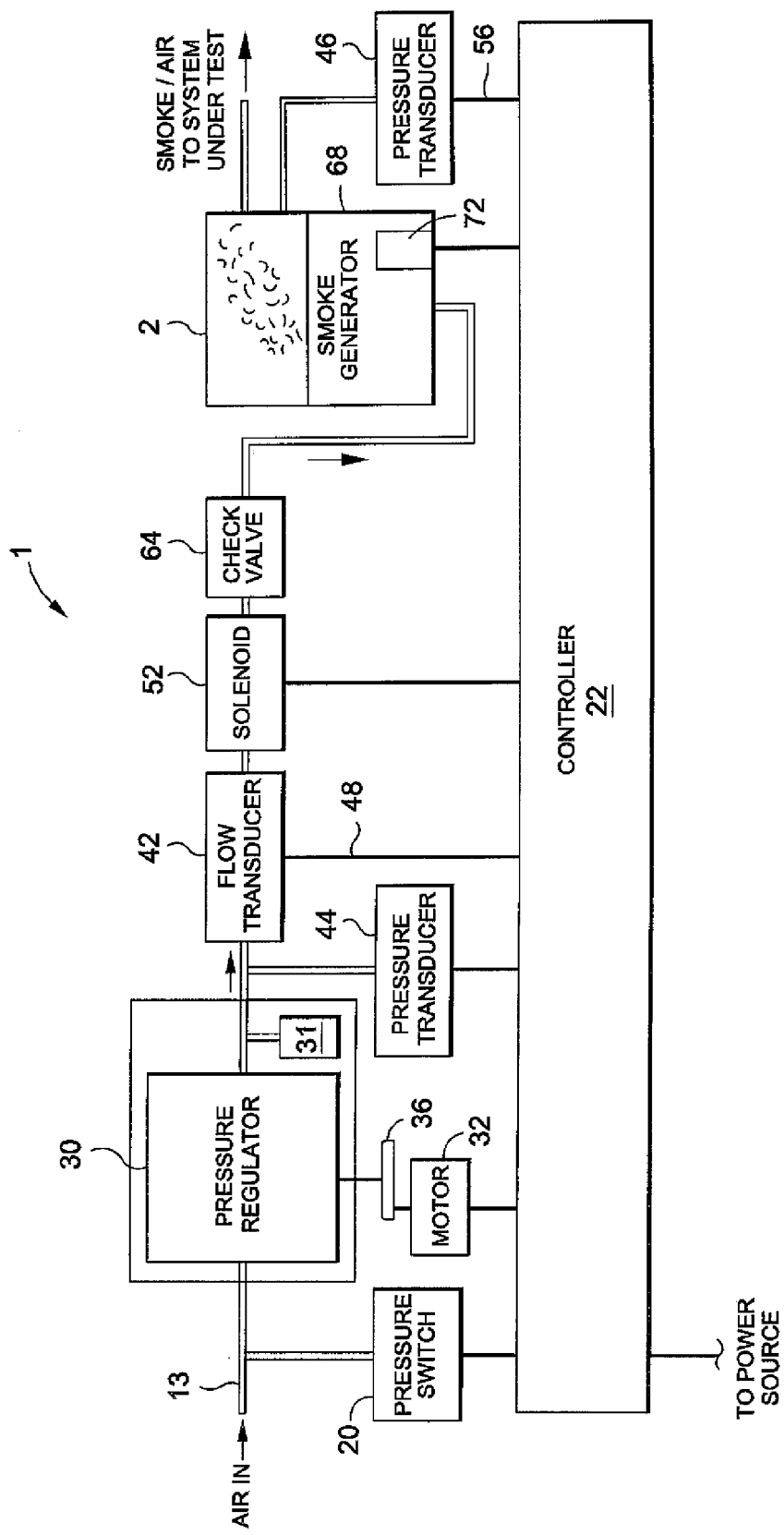
FIG. 7 is a block diagram that is illustrative of the interconnection of the components of the leak detecting apparatus shown in FIGS. 4-6.

A preferred method for operating the automatic pressure-adjusting leak detecting apparatus 1 of this invention for detecting a leak in a closed fluid system is now disclosed while referring to FIGS. 7 and 8 of the drawings. As was earlier pointed out, the leak detecting apparatus has particular application for detecting a leak in a fluid system that runs at high pressure in a motor vehicle. However, it is to be understood that leak detecting apparatus 1 is not limited to locating leaks in either a motor vehicle or a high pressure system. That is to say, the apparatus 1 can be used for leak detection in other fluid (e.g., plumbing) systems regardless of their application or operating pressure.

Turning first to the block diagram of FIG. 7, (e.g., compressed) air under pressure is supplied to the leak detecting apparatus 1 at the inlet fitting 13 thereof. The on/off pressure switch 20 signals the controller 22 when the pressure of the inlet air exceeds a minimum pre-determined pressure threshold. Filtered inlet air is then supplied to the pressure regulator 30. The integrated pressure bleed orifice 31 of pressure regulator 30 enables the air pressure of regulator 30 to be reset at the start of each new leak test and to allow better air pressure regulation during the test. Once an optimal test pressure is initially set by the operator, the pressure regulator 30 is driven (i.e., automatically adjusted) by the stepper motor 32. The rotation of the meshed reduction gears 36 of stepper motor 32 and the adjustment of the pressure regulator 30 is now entirely controlled by the controller 22.

A regulated supply of filtered air is delivered from the pressure regulator 30 to flow transducer 42. The controller 22 is responsive to the rate at which the regulated air flows to and is measured by transducer 42. The first pressure transducer 44 (of the pair of pressure transducers 44 and 46 of FIG. 4) is pneumatically connected to the T-coupler 50 (of FIG. 4) so as to measure the air pressure at the inlet side of the solenoid 52 which communicates with the outlet nozzle 40 of pressure regulator 30.

As previously described, the regulated air from pressure regulator 30 and flow transducer 42 flows through the solenoid 52 provided that the start/stop push button 84 (of FIG. 4) on the control panel 7 of controller 22 has been depressed to initiate a leak test and the solenoid has been opened by the controller. The regulated air at the outlet side of solenoid 52 flows through the one way check valve 64 to be delivered to the container 68 of the smoke generator 2 by which the system under test is filled with air and pressurized. The check valve 64 prevents the back flow of liquid 70 from the container 68 which might contaminate the apparatus 1. With the heater 72 of smoke generator 2 energized by the controller 22, the (e.g., petroleum based) liquid within the container 68 is heated and volatized into smoke. Accordingly, the smoke is blown by the regulated air that is delivered to the container through the smoke generator air supply tube 60 and inlet nozzle 62 (of FIG. 6) outwardly from the smoke generator 2 so that a mixture of smoke and air is supplied from the leak detecting apparatus 1 by way of vapor outlet port 14 to the system being tested for leaks.

The second pressure transducer 46 is pneumatically connected to the outlet nozzle 58 (of FIG. 5) of the smoke generator 2 so as to measure the pressure of the system undergoing testing for leaks. Thus, for an advantage that will now be explained, the controller 22 which is connected to the first and second pressure transducers 44 and 46 is responsive to the difference between the pressures of the pressure regulator 30 coupled to the inlet side of the solenoid 52 and the system under test coupled to the outlet side of solenoid 52.

Turning in this regard to FIGS. 8A and 8B of the drawings, FIG. 8A illustrates the flow rate (e.g., in liters/minute) over time of the regulated air flowing from the pressure regulator 30 through the flow transducer 42 connected to the controller 22. The flow rate measured by the flow transducer 42 is illustrated prior to, during and after the automatic pressure-adjusting leak detecting apparatus 1 of FIGS. 1-6 tests a system for leaks. FIG. 8B illustrates the pressure (e.g., in psi) over time to which the pressure regulator 30 is automatically adjusted by the controller 22 prior to, during and after the conclusion of the leak test.

Referring concurrently now to FIGS. 1-8, when the leak detecting apparatus 1 is initially powered up, and during a standby time interval 100 and 102 (of FIGS. 8A and 8B) prior to conducting a leak test, the solenoid 52 is closed and no air flows from the pressure regulator 30 through the flow transducer 42 of controller 22. By using push buttons 86 and 88 at the control panel 7, the operator sets the controller 22 in order to adjust the pressure regulator 30 to an optimal maximum test pressure depending upon the specific operating pressure characteristics of the system under test. To initiate a leak test, the start/stop push button 84 at the control panel 7 of FIG. 4 is then depressed, and the solenoid 52 is opened to permit the flow of air therethrough to the smoke generator 2. The controller 22 adjusts the pressure regulator 30 (by means of the stepper motor 32) so that the pressure 104 (of FIG. 8B) of the air being supplied from regulator 30 to the flow transducer 42 gradually increases during a controlled flow time interval. The rate at which the pressure 104 of regulator 30 is increased during the controlled flow time interval is dependent upon the volume of the system under test and the size of the leak. During an overlapping constant flow time interval, the rate 106 (of FIG. 8A) at which the regulated air is supplied from regulator 30 to the flow transducer 42 increases rapidly.

The flow rate measured by the flow transducer 42 will continue to increase until an optimal flow rate 108 (of FIG. 8A) is achieved during the constant flow time interval. The optimal flow rate is pre-determined by the manufacturer of the leak testing apparatus so that the smoke which is mixed with the pressure regulated air and carried from the smoke generator 2 (of FIG. 6) to the system under test will be dense and easily visibly detected at any leak site of the system. The controller 22 is set so as to be responsive to the pre-determined optimal flow rate 108 of the regulated air being supplied from the pressure regulator 30 to smoke generator 2 and measured by flow transducer 42.

In other words, the controller 22 slowly increases the pressure 104 of the pressure regulator 30 so as to correspondingly increase the flow rate 106 of the regulated air supply to the smoke generator 2 to an optimal level 108 at which the smoke which is blown through any leak in the system under test will not become thin, diluted and substantially invisible. The optimal flow rate 108 (of FIG. 8A) of the air being supplied from the pressure regulator 30 to the smoke generator 2 is held constant (regardless of the increasing pressure 104) throughout the constant flow time interval during which the system under test is being filled and pressurized. The pressure regulator 30 is automatically adjusted (i.e., increased) by the controller 22 to the optimal maximum test pressure 110 which was initially set by the operator prior to the start of the leak test. At this point, the operation of the leak testing apparatus 1 changes from a constant flow mode to a constant pressure mode.

The optimal maximum test pressure 110 to which the pressure regulator 30 is automatically adjusted by the controller 22 at the end of the controlled flow time interval of FIG. 8B is dependent upon the operating pressure characteristics of the system being tested for leaks. That is, to generate the dense smoke necessary to make a reliable leak determination, the pressure regulator 30 is automatically adjusted until the pressure thereof (i.e., equivalent to the air pressure at the inlet side of the solenoid 52 as measured by the first pressure transducer 44 of FIG. 4) is identical to the pressure of the system undergoing testing (i.e., equivalent to the air pressure at the outlet side of the solenoid 52 as measured by the second pressure transducer 46). As previously pointed out, the controller 22 is responsive to the regulator and system pressures at the inlet and outlet sides of the solenoid 52 so as to automatically adjust the pressure regulator 30 until the system under test is pressurized and the regulator and systems pressures have been equalized to the operator-set maximum test pressure 110.

Once the pressure regulator 30 has been adjusted and the corresponding pressure of the regulated gas has been automatically increased to the optimal maximum test pressure 110 at which the regulator and system pressures will be equalized, the optimal pressure is held at a constant level 112 throughout a controlled pressure time interval (of FIG. 8B). During the controlled pressure time interval, the system which is coupled to the leak detecting apparatus 1 in the manner shown in FIG. 6 is fully pressurized and filled with dense smoke so as to now be visually inspected for leaks by looking for the smoke escaping from any leak site.

When the pressure regulator 30 has been adjusted to and maintained at the optimal test pressure 112 and the regulator and system pressures are equalized throughout the controlled pressure time interval of FIG. 8B as just explained, the rate 114 at which the regulated air flows from pressure regulator 30 through the flow transducer 42 quickly falls off to the system leak rate 116 during a constant pressure time interval (of FIG. 8A). The magnitude of the system leak rate 116 is dependent upon (and indicative of) the size of the leak (if any is present) and the constant pressure 112. The length of the constant pressure and the controlled pressure time intervals of FIGS. 8A and 8B during which the system under test is maintained at constant pressure 112 and visually inspected for leaks coincides with one another.

When the operator is satisfied that an accurate leak test has been completed (i.e., during which smoke is observed at any leak site of the system under test), the test is concluded. At this time, the operator once again depresses the start/stop push button 84 at the control panel 7 to stop the test. In the alternative, the controller 22 can be programmed to automatically stop the test at the conclusion of a fixed test period. In either case, the controller 22 de-energizes the heater 72 of the smoke generator 2, drives the pressure regulator 30 to no pressure, and closes the solenoid 52, whereby to block the flow of air therethrough.

At the conclusion of the visual leak test when the system under test is isolated from the pressure regulator by the closed solenoid 52, the operator may observe the test system pressure 118 (measured by pressure transducer 46) indicated at the display 8 of control panel 7. If the system pressure decays (as shown in FIG. 8B) from its constant optimal maximum test pressure 112, an indication is provided that the system has a leak through which the air (and smoke) with which the system has been pressurized is escaping. Moreover, the rate of the pressure decay 118 is indicative of the size of the leak. However, had the optimal test pressure 112 otherwise remained constant throughout the visual leak test and a subsequent pressure decay time interval of FIG. 8B, then a different indication is provided that the system under test is intact and no leak is present. The ability for the operator to observe a decay of the system pressure 118 at the end of the visual leak test is particularly useful to identify the existence (and size) of very small leaks through which little smoke may escape.

When the visual leak test has ended and the system pressure is observed during the pressure decay time interval of FIG. 8B, no air flows through the flow transducer 42 to the smoke generator 2, because the solenoid 52 is now closed and the leak detecting apparatus 1 no longer lies in fluid communication with the system under test. In this case, the flow rate measured by flow transducer 42 during a corresponding no gas flow time interval of FIG. 8A drops from the system leak rate 116 to zero.

It may often be desirable to use the automatic pressure-adjusting leak detecting apparatus 1 of FIGS. 1-6 to indicate the size as well as the presence and location of a leak in a closed fluid system being tested for leaks. For example, some leaks, even though present, can be ignored and no repair made in cases where the leak size is small enough to lie within an acceptable tolerance range established by the manufacturer of the system under test.

Referring in this regard once again to FIGS. 8A and 8B of the drawings, it was previously pointed out that the magnitude of the system leak rate (designated 116 in FIG. 8A) and the rate of pressure decay (designated 118 in FIG. 8B) are indicative of the size of a leak if one were present. That is, the leak size is directly related to the leak rate 116 during the constant pressure time interval of FIG. 8A. Should the leak rate be reduced to zero, then the system is intact and no leak is present. Likewise, the rate at which the pressure 118 decays during the pressure decay time interval of FIG. 8B at the end of the leak test is also directly related to the leak size. However, should there be no pressure decay in which case the pressure 112 of the system under test otherwise remains constant at the conclusion of the leak test, then the system is intact and no leak is present.

The pressure and flow rate data of FIGS. 8A and 8B can be processed to provide a numerical value for the area of a leak according to the relationship:

$$\text{Leak Area} = \frac{Q}{k\sqrt{2\Delta P/D}}$$

where k is a constant (0.82), Q is the system leak rate 116 of FIG. 8B, ΔP is the difference between the optimal maximum test pressure 110 of FIG. 8B and the ambient pressure, and D is the density of the regulated gas (i.e., air) used to pressurize the system under test and carry smoke thereto. The calculation of leak size (i.e., area) can be made by the controller 22 of the leak detecting apparatus 1 or by independent computing apparatus.

The invention claimed is:

1. A leak detecting apparatus to indicate the presence of a leak in a fluid system that is coupled to said apparatus, said leak testing apparatus comprising:
   a gas inlet to receive a gas;
   an adjustable pressure regulator coupled to said gas inlet to provide a pressure regulated supply of the gas received from said gas inlet;
   a smoke generator to produce visible smoke, said smoke generator communicating with the fluid system to be tested for leaks;
   a gas flow path extending between said pressure regulator and said smoke generator so that the pressure regulated supply of gas is delivered to the smoke generator to carry the smoke produced by said generator to the system under test whereby the system is pressurized;
   pressure sensing means communicating with said pressure regulator and with said smoke generator so as to measure the pressure of the pressure regulated supply of gas provided by said pressure regulator and the pressure of the system under test with which the smoke generator communicates;
   a controller interconnected with said adjustable pressure regulator to adjust said pressure regulator and with said pressure sensing means so as to be responsive to the pressure of the regulated supply of gas and the pressure of the system under test, said controller adjusting the pressure of said adjustable pressure regulator until the pressure of the regulated supply of gas and the pressure of the system under test are equalized during which time the system under test is inspected for leaks; and
   a gas flow control switch connected within said gas flow path and having an inlet side which communicates with said adjustable pressure regulator and an outlet side which communicates with said smoke generator, said gas flow control switch electrically connected to said controller to be switched by said controller between a closed condition at which to block the flow of the pressure regulated supply of gas therethrough and an open condition at which to permit the flow of the pressure regulated supply of gas from said pressure regulator to said smoke generator,
   wherein said pressure sensing means includes a first pressure transducer pneumatically coupled between said controller and the inlet side of said gas flow control switch and a second pressure transducer pneumatically coupled between said controller and the outlet side of said gas flow control switch.

2. The leak detecting apparatus recited in claim 1, wherein said gas flow control switch is a solenoid located within said gas flow path and having said inlet and outlet sides.

3. The leak detecting apparatus recited in claim 2, wherein said smoke generator includes a smoke-producing liquid and a heater by which to heat and volatize the liquid into the visible smoke, said controller electrically connected to said solenoid and to said heater so as to cause said heater to be energized at the same time that said solenoid is switched by said controller to the open condition.

4. The leak detecting apparatus recited in claim 2, wherein said first pressure transducer is pneumatically connected to the inlet side of said solenoid at a coupler that lies in fluid communication between said gas flow path and said solenoid.

5. The leak detecting apparatus recited in claim 2, wherein said smoke generator includes a chamber within which the visible smoke is produced to be carried to the system under test, said second pressure transducer pneumatically connected to the outlet side of said solenoid at a coupler that communicates with the interior of said sealed chamber.

6. The leak detecting apparatus recited in claim 1, also comprising an inlet gas pressure-responsive switch lying between said gas inlet and said adjustable pressure regulator and being responsive to the pressure of the gas received by said gas inlet, said controller electrically connected to said inlet gas pressure-responsive switch to receive a signal from said switch and thereby cause said switch to permit the gas to flow from said gas inlet to said adjustable pressure regulator when the gas has at least a certain pre-determined pressure.

7. The leak detecting apparatus recited in claim 1, also comprising a motor connected between said controller and said adjustable pressure regulator by which said controller is interconnected with said pressure regulator, said controller operating said motor by which to correspondingly adjust the pressure regulator until the pressure of the regulated supply of gas and the pressure of the system under test have been equalized.

8. The leak detecting apparatus recited in claim 1, also comprising a flow transducer electrically connected to said controller, said flow transducer located within said gas flow path and being responsive to the rate at which the pressure regulated supply of gas flows therethrough from said adjustable pressure regulator to said smoke generator.

9. The leak detecting apparatus recited in claim 8, wherein said controller includes a display to provide a visual indication of the pressure of the system under test measured by said pressure sensing means and the rate at which the pressure regulated supply of gas flows through said flow transducer located in gas flow path between said adjustable pressure regulator and said smoke generator.

10. A leak detecting apparatus to indicate the presence of a leak in a fluid system that is coupled to said apparatus, said leak testing apparatus comprising:
a gas inlet to receive a gas;
an adjustable pressure regulator coupled to said gas inlet to provide a pressure regulated supply of the gas received from said gas inlet;
an inlet gas pressure-responsive switch lying between said gas inlet and said adjustable pressure regulator and being responsive to the pressure of the gas received by said gas inlet;
a smoke generator to produce visible smoke, said smoke generator communicating with the fluid system to be tested for leaks;
a gas flow path extending between said pressure regulator and said smoke generator so that the pressure regulated supply of gas is delivered to the smoke generator to carry the smoke produced by said generator to the system under test whereby said system is pressurized;
a flow transducer lying within said gas flow path to measure the rate at which the pressure regulated supply of gas flows therethrough from said pressure regulator to said smoke generator;
a controller to adjust the adjustable pressure regulator until the pressure of the pressure regulated supply of gas provided by said pressure regulator and the pressure of the system under test are equalized so as to cause the flow rate measured by said flow transducer to be reduced at which time the system under test is inspected for leaks, said controller being electrically connected to said inlet gas pressure-responsive switch to receive a signal from said switch and thereby cause said switch to permit the gas to flow from said gas inlet to said adjustable pressure regulator when the gas has at least a certain pre-determined pressure so that the adjustable pressure regulator can then be adjusted by said controller; and
a motor connected between said controller and said adjustable pressure regulator, said controller operating said motor and said motor correspondingly adjusting said pressure regulator until the pressure of the regulated supply of gas provided by said pressure regulator and the pressure of the system under test have been equalized.

11. The leak detecting apparatus recited in claim 10, also comprising pressure sensing means pneumatically coupled between said controller and each of said adjustable pressure regulator and said smoke generator so as to measure the pressure of the pressure regulated supply of gas produced by said pressure regulator and the pressure of the system under test with which the smoke generator communicates, said controller being responsive to the flow rate measured by said flow transducer and to the difference between the pressures measured by said pressure sensing means of the pressure regulated supply of gas produced by said pressure regulator and the system under test.

12. The leak detecting apparatus recited in claim 11, also comprising a solenoid connected within said gas flow path and having an inlet side which communicates with said adjustable pressure regulator and an outlet side which communicates with said smoke generator, said solenoid electrically connected to said controller to be switched by said controller between a closed condition at which to block the flow of the pressure regulated supply of gas therethrough and an open condition at which to permit the flow of the pressure regulated supply of gas from said pressure regulator to said smoke generator.

13. The leak detecting apparatus recited in claim 12, wherein said pressure sensing means includes a first pressure transducer pneumatically coupled between said controller and the inlet side of said solenoid and a second pressure transducer pneumatically coupled between said controller and the outlet side of said solenoid.

14. The leak detecting apparatus recited in claim 13, wherein said first pressure transducer is pneumatically connected to the inlet side of said solenoid at a coupler that lies in fluid communication between said gas flow path and said solenoid.

15. The leak detecting apparatus recited in claim 13, wherein said smoke generator includes a chamber within which the visible smoke is produced to be carried to the system under test, said second pressure transducer connected to the outlet side of said solenoid at a coupler that communicates with the interior of said sealed chamber.

16. A method for testing a fluid system for leaks, said method comprising the steps of:
connecting the system under test so as to lie in fluid communication with a smoke generating chamber;
generating smoke within said smoke generating chamber;
supplying from a source thereof a regulated gas having an adjustable pressure to said smoke generating chamber to carry the smoke from said chamber to the system being tested for leaks whereby to pressurize said system;
measuring the pressure of said regulated gas by means of a first pressure transducer communicating with said source of regulated gas;
measuring the pressure of the system under test by means of a second pressure transducer communicating with said smoke generating chamber; and
comparing the pressures measured by said first and second pressure transducers and adjusting the pressure of said regulated gas until the pressure of said regulated gas and the pressure of the system under test are equalized; and visually inspecting the system under test by identifying smoke which exits any leak site in the system when the pressures of said regulated gas and said system are equalized.

17. The method recited in claim 16, comprising the additional steps of identifying an optimal maximum test pressure depending upon the operating pressure of the system being tested for leaks; and adjusting the pressure of said regulated gas to said optimal maximum test pressure so that the pressure of said regulated gas and the pressure of the system under test are equalized.

18. The method recited in claim 17, comprising the additional step of holding the pressure of said regulated gas constant at said optimal maximum test pressure throughout a controlled pressure time interval when the pressures of said regulated gas and said system under test are equalized and said system is being visually inspected for leaks.

19. The method recited in claim 18, comprising the additional steps of interrupting the supply of regulated gas from the source thereof to the smoke generating chamber at the conclusion of said controlled pressure time interval; and measuring the rate at which the pressure of the system under test decays from said maximum test pressure for indicating whether said system has a leak and the size of such leak.

20. The method recited in claim 18, comprising the additional steps of identifying an optimal maximum flow rate at which the regulated gas is to be supplied from said source thereof to said smoke generating chamber such that smoke which exits any leak site in the system under test can be visually detected; adjusting the pressure of said regulated gas so that the flow rate of said regulated gas is correspondingly increased to said optimal maximum flow rate; and holding the maximum flow rate of the regulated gas constant regardless of the pressure to which the regulated gas is adjusted until the pressure of said regulated gas and the pressure of the system under test have been equalized.

21. The method recited in claim 20, comprising the additional step of measuring the flow rate at which the regulated gas is supplied from said source thereof to said smoke generating chamber and holding said flow rate constant once said optimal maximum flow rate is measured until the pressure of said regulated gas and the pressure of said system under test have been equalized.

22. The method recited in claim 21, comprising the additional step of measuring the flow rate of the regulated gas supplied from said source thereof to said smoke generating chamber after the pressure of said regulated gas and the pressure of said system under test have been equalized for providing an indication of the size of any leak in the system under test.

* * * * *